United States Patent [19]

Fairclough

[11] Patent Number: 4,471,922
[45] Date of Patent: Sep. 18, 1984

[54] STEERING LINKAGE

[75] Inventor: Roy Fairclough, Warrington, England

[73] Assignee: Automotive Products plc, Leamington Spa, England

[21] Appl. No.: 439,203

[22] Filed: Nov. 4, 1982

[30] Foreign Application Priority Data

Nov. 7, 1981 [GB] United Kingdom ................ 8133651

[51] Int. Cl.³ ............................................ B64C 25/50
[52] U.S. Cl. ......................................... 244/50; 74/42; 180/161
[58] Field of Search ................ 244/50, 100 R, 103 W, 244/103 S; 180/161, 79, 140; 74/25, 42

[56] References Cited

U.S. PATENT DOCUMENTS

| 2,759,687 | 8/1956 | Hogan | 244/50 |
| 2,879,815 | 3/1959 | Papworth | 74/42 |
| 2,919,084 | 12/1959 | Lovell | 244/50 |
| 2,930,548 | 3/1960 | Hamilton | 244/50 |
| 2,943,817 | 7/1960 | Hogan | 244/50 |

Primary Examiner—Galen L. Barefoot
Attorney, Agent, or Firm—Kemon & Estabrook

[57] ABSTRACT

A wheel steering linkage includes a first arm pivoted about the wheel steering axis, a second arm pivoted intermediate its ends to the first arm, a third arm pivoted at one end to the second arm and at the other end about a fixed axis, and a fourth variable length arm pivoted at one end to the second arm and at the other end about a fixed axis. The fourth arm may be a servo motor.

4 Claims, 5 Drawing Figures

STEERING LINKAGE

This invention relates to steering linkages particularly though not exclusively suitable for nose wheels of aircraft undercarriages.

The nose wheel of an aircraft undercarriage is usually steerable by the pilot to give a small degree of directional control, usually in the range ±30° to ±60°.

It is usual for aircraft to be manoeuvered on the ground by a tug pulling on the nose wheel undercarriage and under these conditions a greater degree of nose wheel angular movement is permissable and indeed desirable in confined spaces. Angular movements greater than ±90° may be provided.

One problem with steering linkages used hitherto is that the pilots steering linkage must be disconnected to allow castoring of the nose wheel through the greater angle. This is undesirable since it disturbs a precision mechanism and can lead to failure or inadvertent wrong re-assembly.

The present invention seeks to provide a nose wheel steering linkage which will allow greater than ±90° angular movement of the nose wheel without mechanical disconnection of the pilots steering linkage whilst being also of compact and relatively simple construction.

According to the invention there is provided a steering linkage for a wheel and comprising a first fixed length effective arm pivoted at one end about the steerable axis of the wheel, a second fixed length effective arm pivoted intermediate its ends to the other end of said first arm, a third fixed length effective arm pivoted at one end to said second arm and at the other end about a fixed axis, a fourth variable length effective arm pivoted at one end to the other end of said second arm and at the other end about a fixed axis, the lengths of the first, second and third arms being such that rotation of the first arm results in oscillation of the third arm.

In one embodiment said second arm comprises a diameter of a ring journalled on a hub, the hub being rotatable about an axis intermediate the centre and the periphery of the hub, the line between the centre of the hub and the centre of rotation of the hub constituting said first arm.

Other features of the invention are included in the following description of a preferred embodiment shown, by way of example only, in the accompanying drawings in which.

Figure 1:
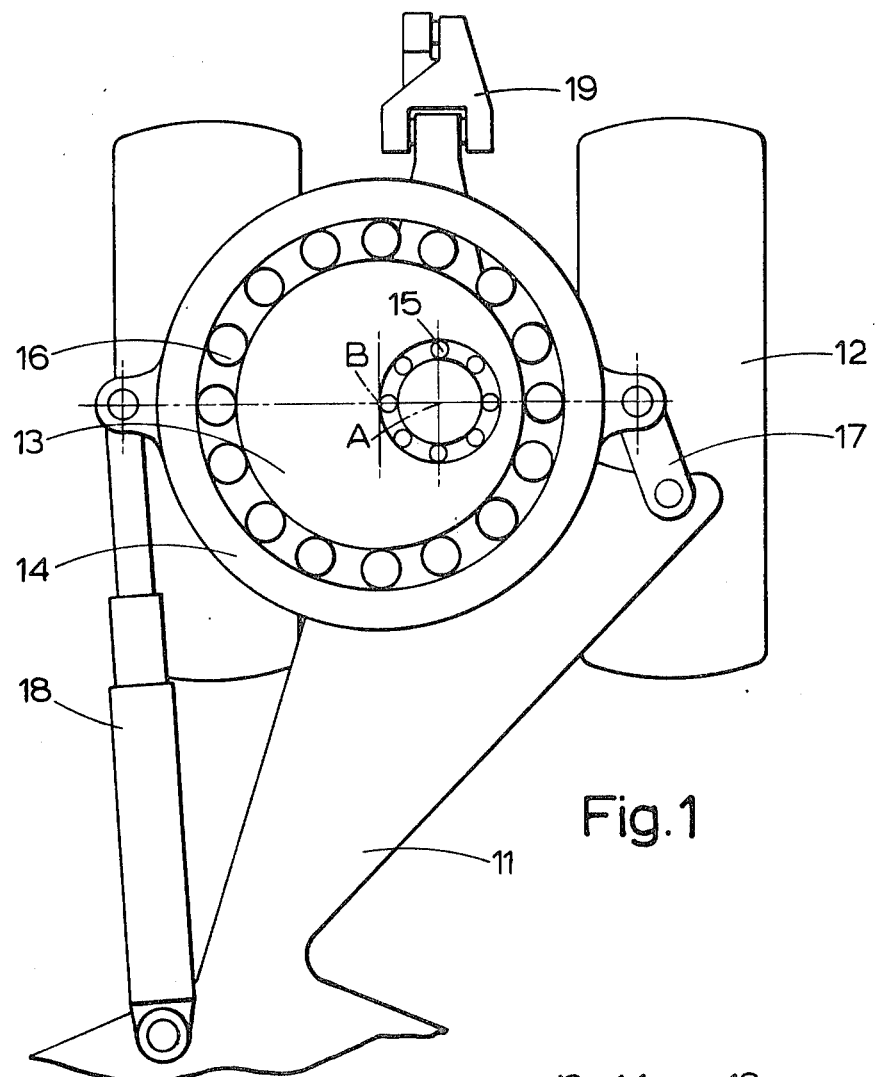
FIG. 1 is a plan view of a steering linkage according to the invention.
Figure 2:
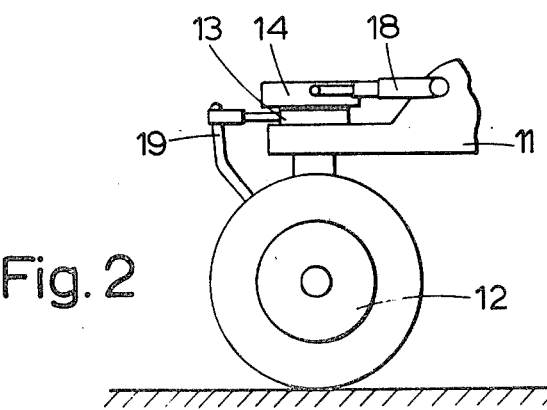
FIG. 2 is an illustrative elevation of the steering linkage and a steered wheel.

With reference to FIGS. 1 and 2, there is shown an aircraft airframe member 11 having an undercarriage nose wheel unit 12 pivotable thereon about a fixed axis A. The unit 12 is shown in the straight ahead position. A circular steering member 13 having its axis of symmetry at B but eccentrically pivoted about the fixed nose wheel axis A is housed in a guide ring 14. Relative angular movement for eccentric rotation of the member 13 about axis A and for relative angular movement between member 13 and ring 14 about axis B is provided by two series of ball bearings 15 and 16.

The ring 14 is guided for movement on the airframe by two free pivoting links fixed at one respective end to diametrically opposite points on the ring periphery. The other ends of the links are fixed to respective fixed pivot points on the airframe.

One link 17 is of fixed length whilst the other is necessarily of adjustable length and may be a telescopic jack 18 as shown in the preferred embodiment.

Drag means 19 connect the steering member 13 to nose wheel unit 12, such drag means are not part of the present invention but must allow for suspension movement of the nose wheel with respect to the airframe. Angular position of the nose wheel unit 12 will, in any event, be directly related to angular position of the steering member 13 about the nose wheel axis A.

Figure 3:
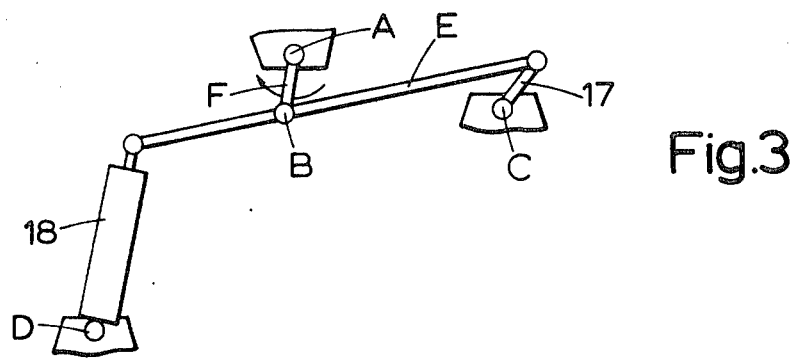
FIG. 3 is a diagrammatic representation of the steering linkage at one position.
Figure 4:
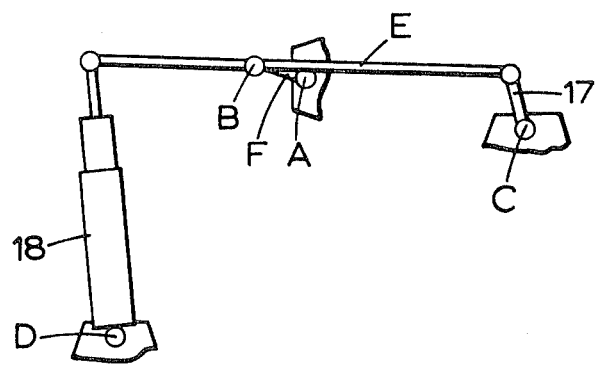
FIG. 4 is a diagrammatic representation of the steering linkage of FIG. 3 turned through approximately 90°.
Figure 5:
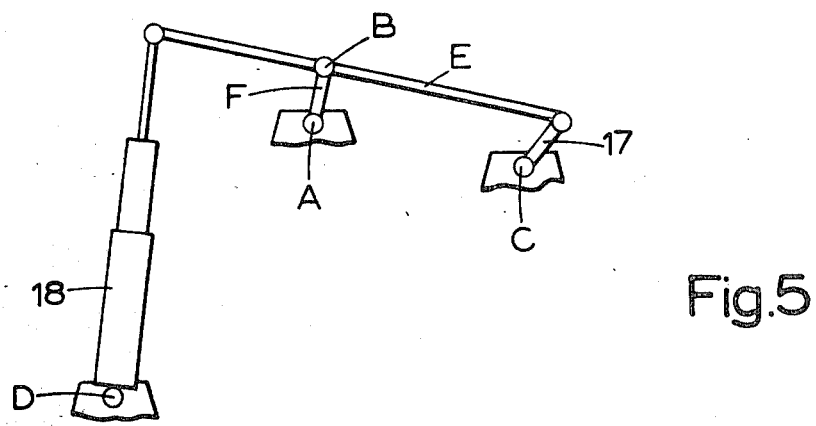
FIG. 5 is a diagrammatic representation of the steering linkage of FIG. 3 turned through approximately 180°.

Operation of the linkage can be most easily understood by additional reference to FIGS. 3-5. Axes A and B are marked together with the fixed axes of link 17 and jack 18, respectively C and D. The link arm E represents the pivot diameter of the guide ring 14 and the link arm F the orientation of the steering member 13.

FIG. 3 represents the linkage with the jack at minimum stroke, FIG. 4 with the jack halfway extended and FIG. 5 with the jack fully extended, the angle of the arm F with respect to the airframe being representative of the true nose wheel angle.

For pilot controlled steering the jack 18 would operate to swing the link arm through ±30° about the mean position of FIG. 4 although up to approximately ±80° would be available if required.

For ground manoeuvre the pilots steering linkage is inoperative since hydraulic pressure is not available to actuate the jack 18. The jack is arranged to be open circuit in this condition. Thus the nose wheel is able to castor freely through 360°, or through such angle as is deemed acceptable by the aircraft manufacturer, without mechanical disconnection of the pilots steering linkage.

I claim:

1. A steering linkage for a wheel of an aircraft undercarriage and comprising:
    a first fixed length effective arm pivoted at one end about the steerable axis of the wheel;
    a second fixed length effective arm pivoted intermediate its ends to the other end of said first arm;
    a third fixed length effective arm pivoted at one end to said second arm and at the other end about a first fixed axis;
    a fourth variable length effective arm pivoted at one end to the other end of said second arm and at the other end about a second fixed axis;
    the ends of the second arm being on opposite sides of the steerable axis and the length variation of the fourth arm being arranged to produce a steering force which is generally tangential to an arc about the pivot intermediate the ends of the second arm, and the lengths of the first, second and third arms being such that rotation of the first arm results in oscillation of the third arm.

2. A steering linkage according to claim 1; characterized thereby that said fourth effective arm comprises a hydraulic jack having a piston rod pivoted at its free end to said other end of said second arm and a cylinder pivoted at its end remote from the piston rod to the second fixed axis.

3. A steering linkage according to claim 2, characterised thereby that said second arm comprises a diameter of a ring journalled on a hub, the hub being rotatable about an axis intermediate the centre and the periphery of the hub, the line between the centre of the hub and the centre of rotation of the hub constituting said first arm.

4. A steering linkage according to claim 3, characterised thereby that said diameter of said ring and said line are co-linear at the mean position of the linkage.

* * * * *